(12) United States Patent
Morioka et al.

(10) Patent No.: US 10,583,870 B2
(45) Date of Patent: Mar. 10, 2020

(54) FASTENING COMPONENT FOR VEHICLES AND FASTENING STRUCTURE FOR VEHICLES

(71) Applicant: FUTABA INDUSTRIAL CO., LTD., Aichi (JP)

(72) Inventors: Yoshihiro Morioka, Aichi (JP); Hirotaka Niinomi, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 0 days.

(21) Appl. No.: 15/852,932

(22) Filed: Dec. 22, 2017

(65) Prior Publication Data

US 2018/0178852 A1 Jun. 28, 2018

(30) Foreign Application Priority Data

Dec. 27, 2016 (JP) .................................. 2016-253127

(51) Int. Cl.
*B62D 25/14* (2006.01)
*B60K 37/02* (2006.01)
(Continued)

(52) U.S. Cl.
CPC ............ *B62D 27/065* (2013.01); *B60K 37/02* (2013.01); *B62D 25/081* (2013.01); *B62D 25/145* (2013.01); *B60K 2370/60* (2019.05)

(58) Field of Classification Search
CPC .. B62D 25/081; B62D 25/145; B62D 27/065; B60K 37/02; B60K 235/40
See application file for complete search history.

(56) References Cited

U.S. PATENT DOCUMENTS

| 4,705,425 A | 11/1987 | Okawa | |
| 8,202,033 B2 * | 6/2012 | Choi | B62D 25/147 |
| | | | 411/535 |
| 9,302,716 B2 * | 4/2016 | Sahi | B62D 27/065 |

FOREIGN PATENT DOCUMENTS

| JP | S57141216 U | 9/1982 |
| JP | S6256808 U | 4/1987 |

(Continued)

OTHER PUBLICATIONS

English translation of the Notice of Reasons for Rejection, dated Jan. 22, 2019 for corresponding Japanese Patent Application No. 2016-253127.

(Continued)

*Primary Examiner* — D Glenn Dayoan
*Assistant Examiner* — Melissa Ann Bonifazi
(74) *Attorney, Agent, or Firm* — David D. Brush; Westman, Champlin & Koehler, P.A.

(57) ABSTRACT

Provided is a fastening component for vehicles that comprises a holding member, a nut, and a spacer. The holding member is made of a piece of plate material and bent to form first and second opposing portions that oppose each other. The nut comprises a bolt insertion hole and is arranged on an outer surface of the first opposing portion. The spacer having a cylindrical shape is arranged on an outer surface of the second opposing portion. The holding member comprises first and second through holes respectively penetrating the first and second opposing portions in respective thickness directions thereof. The first and second through holes are arranged to be continuous with the bolt insertion hole of the nut. The spacer is arranged to surround the bolt insertion hole when viewed along a central axis of the nut.

7 Claims, 4 Drawing Sheets

(51) Int. Cl.
B62D 27/06 (2006.01)
B62D 25/08 (2006.01)

(56) References Cited

FOREIGN PATENT DOCUMENTS

| | | |
|---|---|---|
| JP | S63172723 U | 11/1988 |
| JP | 2010105585 A | 5/2010 |
| JP | 2014056514 A | 3/2014 |

OTHER PUBLICATIONS

English translation of Japanese Notice of Reasons for Rejection dated Jul. 30, 2018 in corresponding Japanese Patent Application No. 2016-253127.
English translation of Japanese Notice of Reasons for Rejection dated Jul. 3, 2018 in corresponding Japanese Patent Application No. 2016-253127.
English translation of the Chinese Office Action dated Oct. 11, 2019 for corresponding Chinese Application No. 201711420527.X.

* cited by examiner

FASTENING COMPONENT FOR VEHICLES AND FASTENING STRUCTURE FOR VEHICLES

CROSS-REFERENCE TO RELATED APPLICATIONS

This application claims the benefit of Japanese Patent Application No. 2016-253127 filed on Dec. 27, 2016 with the Japan Patent Office, the entire disclosure of which is incorporated herein by reference.

BACKGROUND

The present disclosure relates to a fastening component for vehicles.

There is a known fastening structure that fastens in a vehicle a mounting member and a target, to which the mounting member is mounted, with a bolt and a nut (see Japanese Unexamined Patent Application Publication No. 2010-105585). The fastening structure fixes the mounting member and the target with a spacer member or the like arranged between the mounting member and the target.

In a conventional fastening structure, as shown in FIG. 4, a mounting member 106 having a plate-shaped portion (for example, a bracket) is provided with a nut 103 and a spacer 104. The nut 103 is attached to an opposite surface of the mounting member 106 relative to a target 100 by, for example, projection welding. The spacer 104 is attached to a surface of the mounting member 106 facing the target 100 by, for example, arc welding. By inserting a bolt 107 through the target 100 to be screw-engaged in the nut 103, the mounting member 106 is fastened to the target 100. The spacer 104 has a through-hole for passing a shaft of the bolt 107, and thus is tube shaped.

That is, in the conventional fastening structure, the nut 103 and the spacer 104 are attached to the both surfaces of the mounting member 106. Accordingly, when one of the nut 103 and the spacer 104 is attached to the mounting member 106, the mounting member 106 is deformed, thereby resulting in a reduced attachment accuracy when attaching the other of the nut 103 and the spacer 104. Also, foreign matter, such as dust (for example, sputter during welding), which is generated during attachment of one of the nut 103 and the spacer 104 may be entrapped in the other of the nut 103 and the spacer 104, thereby leading to a deterioration in quality.

SUMMARY

In one aspect of the present disclosure, it is preferable to provide a fastening component for vehicles that achieves an excellent position accuracy of a nut and a spacer, as well as a reduction in entrance of foreign matter into the nut and the spacer.

One embodiment of the present disclosure is a fastening component for vehicles that comprises a holding member, a nut, and a spacer. The holding member is made of a piece of plate material and is bent to form a first opposing portion and a second opposing portion that oppose each other. The nut comprises a bolt insertion hole and is arranged on an outer surface of the first opposing portion. The spacer has a cylindrical shape and is arranged on an outer surface of the second opposing portion. Also, the holding member comprises a first through hole penetrating the first opposing portion in a thickness direction thereof and a second through hole penetrating the second opposing portion in a thickness direction thereof. The first and second through holes are arranged to be continuous with the bolt insertion hole of the nut. The spacer is arranged to surround the bolt insertion hole when viewed along a central axis of the nut.

Such configuration allows attachment of the nut and the spacer in separated positions of the holding member, unlike a conventional manner of attaching the nut and the spacer to front and reverse surfaces in the same area of the plate material. Thus, it is possible to reduce deterioration in attachment accuracy of one of the nut and the spacer that may be caused by deformation of the holding member during attachment of the other of the nut and the spacer. Also, it is possible to reduce entrance of foreign matter, which is generated during attachment of one of the nut and the spacer, inside the other of the nut and the spacer.

Another embodiment of the present disclosure is a fastening structure for vehicles that comprises the fastening component and a mounting member comprising a plate-shaped portion. The mounting member is configured to be held by the first and second opposing portions of the holding member and comprises an opening arranged to be continuous with the bolt insertion hole of the nut. According to such configuration, the fastening component that comprises the holding member allows reduction in deterioration of position accuracy of the nut and spacer and reduction in entrance of foreign matter; thus, an improved attachment workability to a dash panel or a cowl panel and an improved reliability of a fixed state after fastening can be achieved.

Another embodiment of the present disclosure may further comprise an instrument panel reinforcement. Also, the mounting member may comprise a brace having one end portion coupled to the instrument panel reinforcement and the other end portion fastened to a dash panel or a cowl panel of a vehicle. According to such configuration, it is possible to easily and firmly fix the instrument panel reinforcement to the dash panel or the cowl panel through the spacer.

Another embodiment of the present disclosure may further comprise a bolt configured to be screw-engaged in the bolt insertion hole of the nut. Also, the bolt may be configured to be inserted through the spacer into the bolt insertion hole. According to such configuration, it is possible to easily and firmly fasten a mounting member, such as a brace, to a target by inserting the bolt from inside the dash panel or the cowl panel to be fastened with the fastening component.

BRIEF DESCRIPTION OF THE DRAWINGS

One embodiment of the present disclosure will be described hereinafter by way of example with reference to the accompanying drawings, in which.

DETAILED DESCRIPTION OF THE PREFERRED EMBODIMENTS

1. First Embodiment

[1-1. Configuration]

Figure 1:
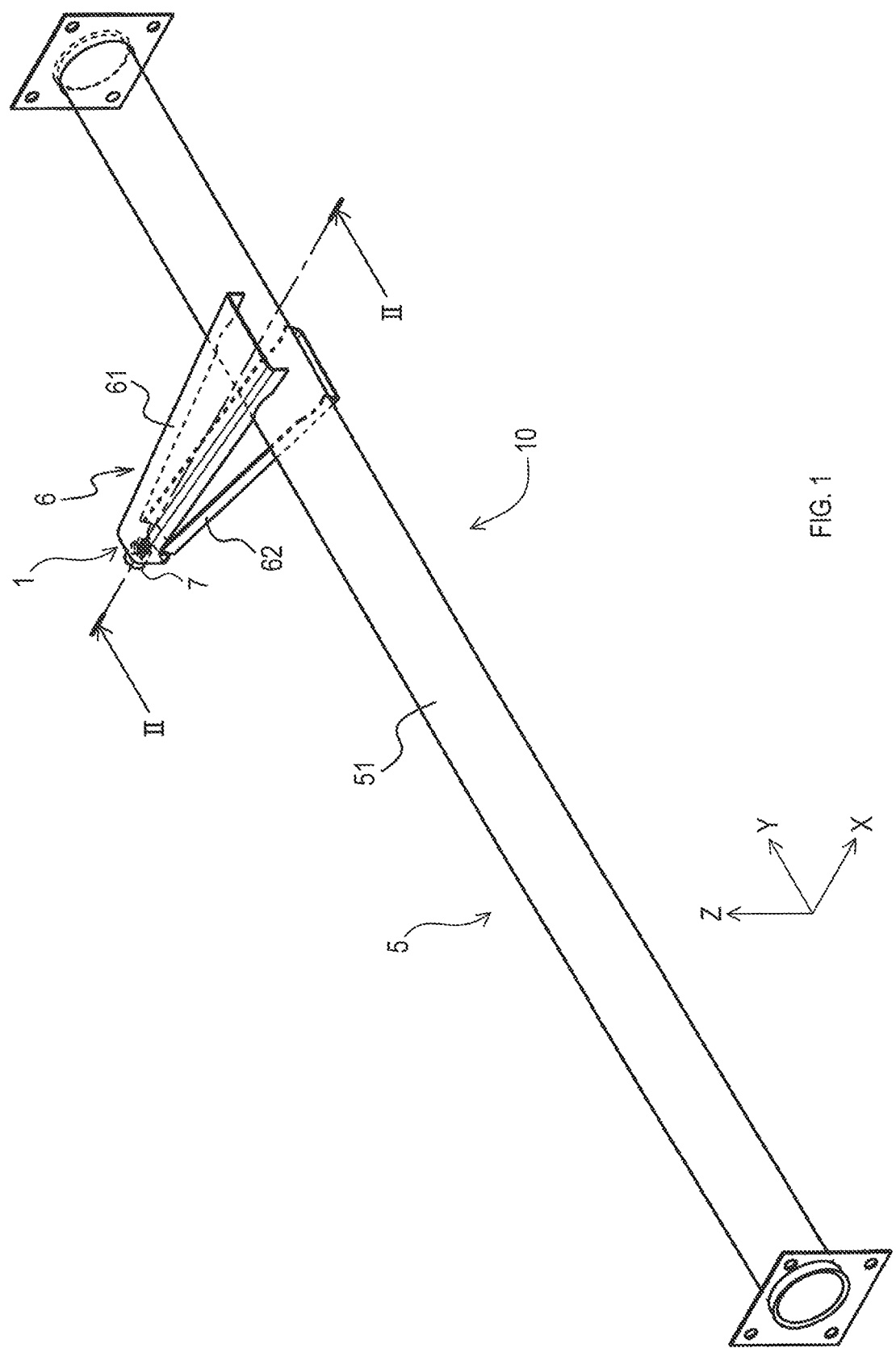
FIG. 1 is a schematic perspective view of a fastening structure for vehicles in the embodiment.

A fastening structure for vehicles 10 (hereinafter also simply referred to as a "fastening structure") shown in FIG.

1 is a structure to fasten a mounting member to a target in a vehicle. The fastening structure 10 comprises a fastening component 1, an instrument panel reinforcement 5, a brace 6, and a bolt 7. In the present embodiment, a part of the brace 6 corresponds to the mounting member.

<Instrument Panel Reinforcement>

The instrument panel reinforcement 5 is arranged in an instrument panel (not shown) in a vehicle right-left direction, that is, in a direction perpendicular to a vehicle front-rear direction, between a driver's seat-side pillar (not shown) and a passenger's seat-side pillar (not shown). As shown in FIG. 1, the instrument panel reinforcement 5 comprises a cylindrical main body 51. The main body 51 supports a steering column (not shown) through members, such as a bracket.

<Brace>

The brace 6 is a metal member that is configured to fix the instrument panel reinforcement 5 to a dash panel or a cowl panel as a target 100.

As shown in FIG. 1, the brace 6 comprises a mounting member 61, which comprises a plate-shaped portion, provided above the main body 51 of the instrument panel reinforcement 5 and a plate-like supplemental mounting member 62 provided below the main body 51. The brace 6 is coupled to the main body 51 by, for example, welding such that respective end portions of the mounting member 61 and the supplemental mounting member 62 on a vehicle rear side hold therebetween the cylindrical main body 51 of the instrument panel reinforcement 5.

Figure 2:
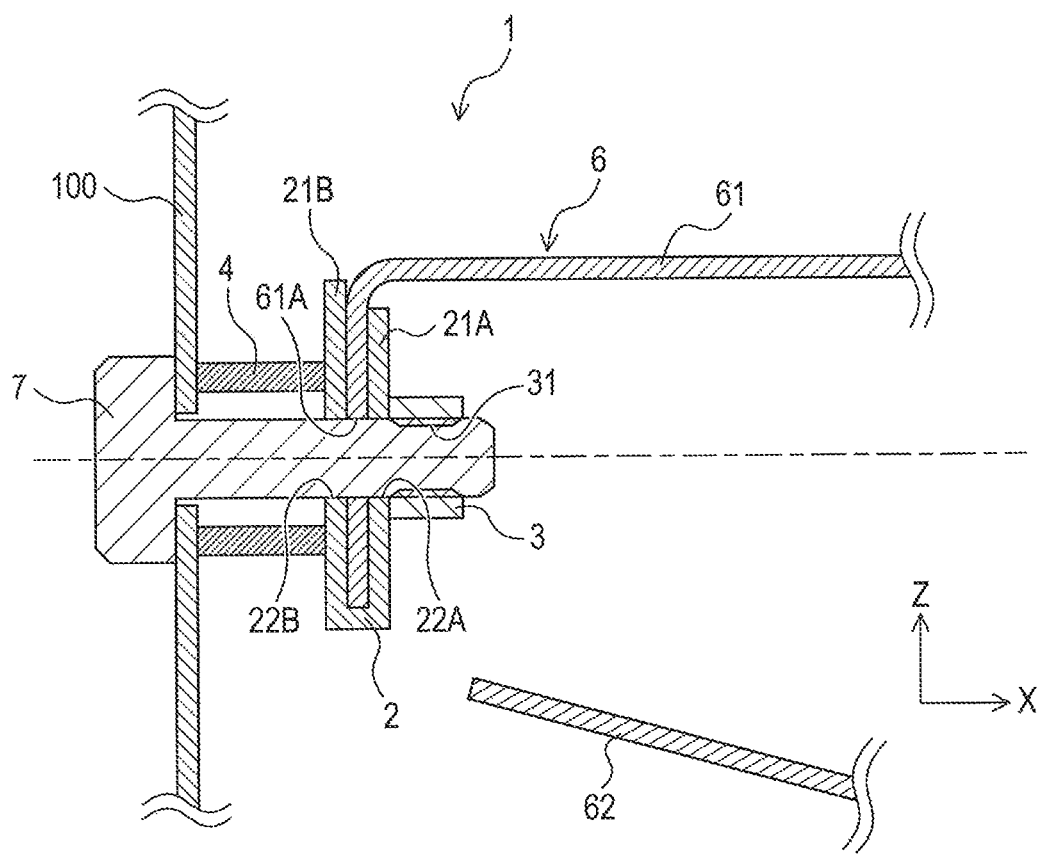
FIG. 2 is a schematic sectional view of a fastening component in FIG. 1 taken along a line II-II.

As shown in FIG. 2, the mounting member 61 has an L-shape and comprises an end portion on a vehicle front side that is bent downward of the vehicle, and the bent end portion is held by and between the first and second opposing portions 21A, 21B of the holding member 2. Also, the mounting member 61 comprises an opening 61A formed in the end portion on the vehicle front side so as to be coaxial and continuous with the bolt insertion hole 31 of a nut 3. Further, the mounting member 61 comprises both end portions in the vehicle right-left direction (the Y-axis direction in the figure), and the both end portions are bent downward of the vehicle.

The mounting member 61 is fastened to the target 100 by the fastening component 1 and the bolt 7, thereby being mounted to the target 100. As a result, the instrument panel reinforcement 5 is fixed to the target 100 (that is, the dash panel or the cowl panel) through the brace 6.

<Fastening Component>

The fastening component 1 shown in FIG. 2 is a fastening component for vehicles to fasten and fix the mounting member 61 to the target 100 in a vehicle structure. The target 100 is a dash panel or a cowl panel.

The fastening component 1 comprises a holding member 2, the nut 3 and a cylindrical spacer 4. There is no particular limitation to a material for the fastening component 1, and resin or preferably metal may be employed. Examples of the metal may include iron, steel, and light metal, such as aluminum.

(Holding Member)

The holding member 2 is a clip-shaped member formed of a piece of plate material (like a flexible money clip). The holding member 2 is formed by bending the plate material so as to form a first opposing portion 21A and a second opposing portion 21B that face each other (each have a mutually facing surface). The holding member 2 is configured to be hold the mounting member 61 having a plate-shaped portion with the first and second opposing portions 21A, 21B. As shown in FIG. 2, the holding member 2 may have a U-shape with an upper open end and a lower bottom surface in a section (an X-Z section) along a vertical plane including a central axis of the bolt 7. An end of the mounting member 61 abuts from above the bottom surface of the holding member 2. In other words, the holding member 2 comprises a groove having a depth in a Z-axis direction and extending in a Y-axis direction, and the mounting member 61 is inserted in the groove.

The first and second opposing portions 21A, 21B of the holding member 2 may have elasticity to enable deformation in opposing directions (in an X-axis direction in the figure) like a money clip. In this case, the first and second opposing portions 21A, 21B, while not holding the mounting member 61, have a distance therebetween that is smaller than a thickness of the mounting member 61. By widening the distance between the first and second opposing portions 21A, 21B and inserting therein the mounting member 61 in the Y-axis direction or the Z-axis direction, the mounting member 61 can be held by the elasticity of the holding member 2.

The holding member 2 comprises a first through hole 22A penetrating the first opposing portion 21A in a thickness direction thereof (in the X-axis direction in FIG. 2) and a second through hole 22B penetrating the second opposing portion 21B in a thickness direction thereof (in the X-axis direction in FIG. 2). The first and second through holes 22A, 22B are arranged to be coaxial and continuous with a bolt insertion hole 31 in the nut 3. That is, the first and second through holes 22A, 22B are each formed in a shape and a position to allow insertion therethrough of the bolt 7 as shown in FIG. 2.

Figure 3:
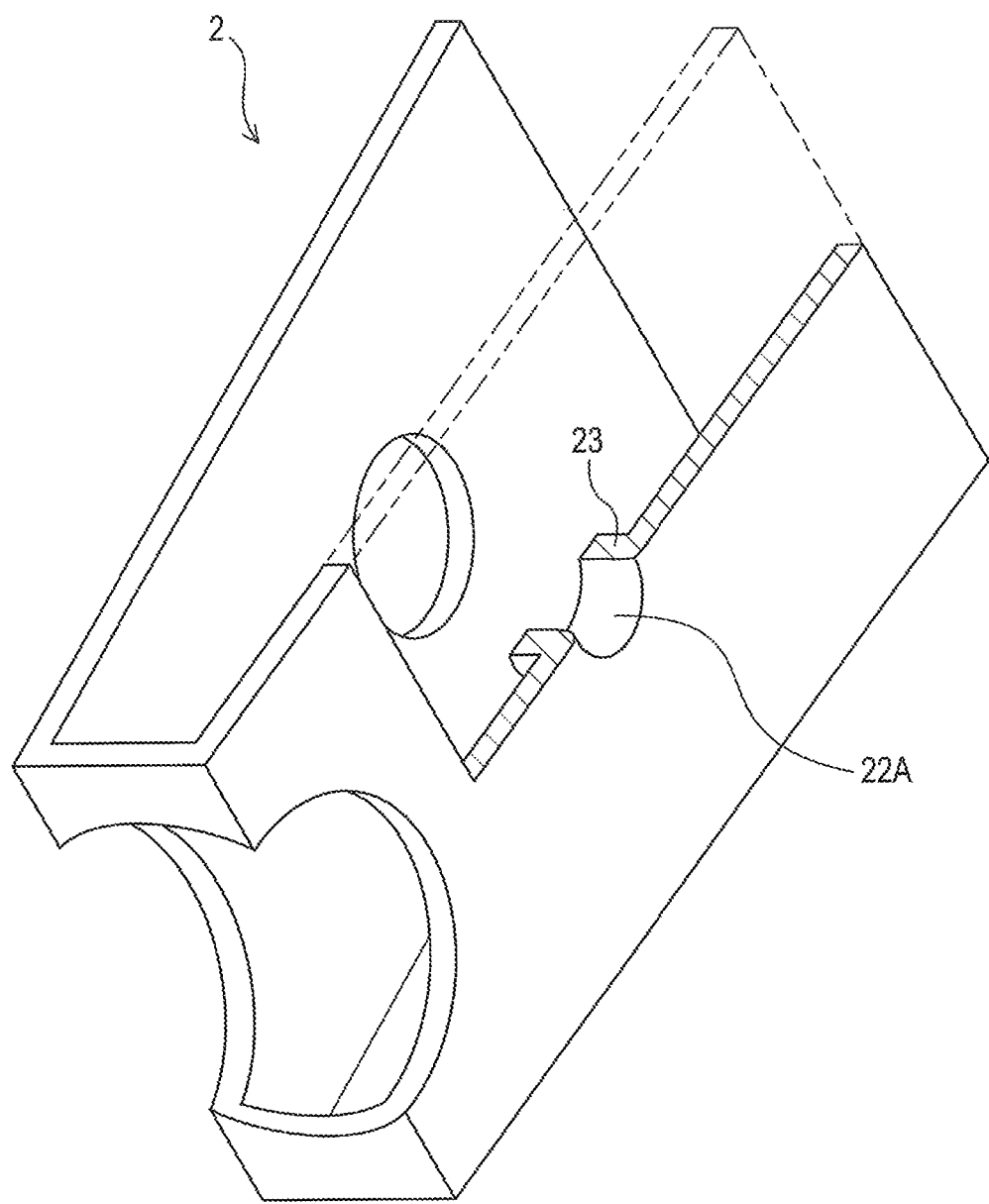
FIG. 3 is a schematic partial sectional perspective view showing one example of a falling prevention device of a holding member.
Figure 4:
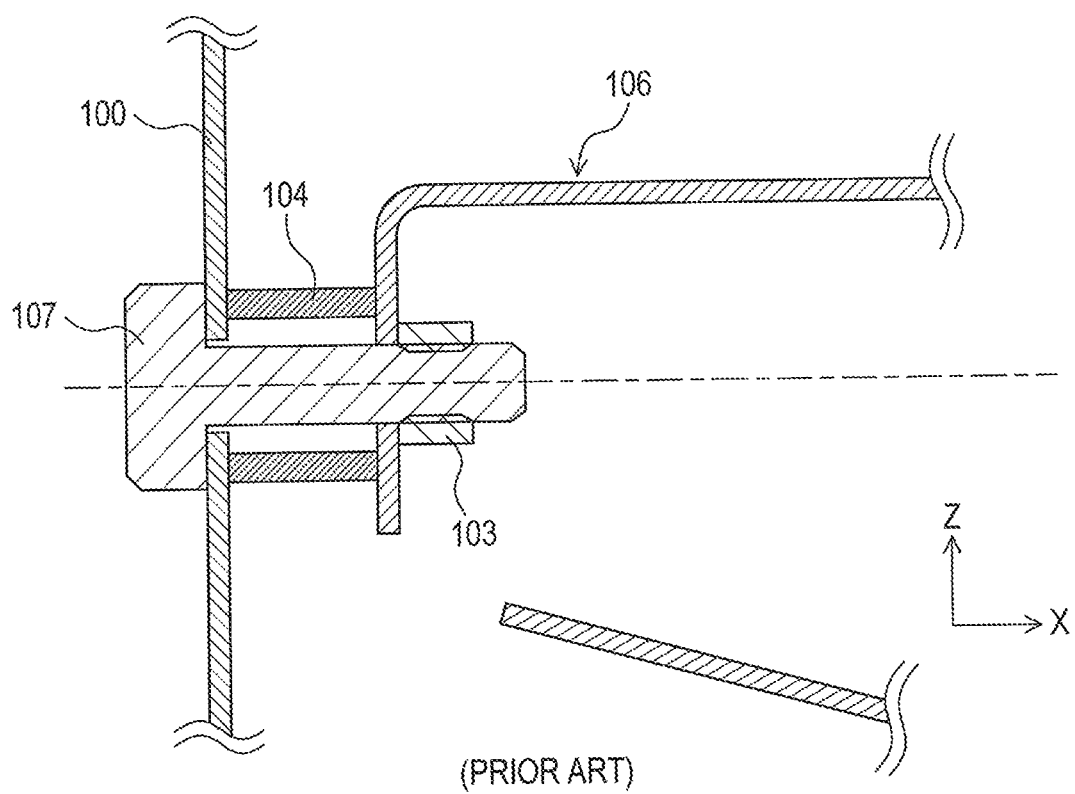
FIG. 4 is a schematic sectional view of a fastening component for vehicles of the conventional art.

The holding member 2 may comprise a known falling prevention device configured to avoid falling of the mounting member 61 held by the holding member 2. The falling prevention device to be provided to the holding member 2 may be, for example, a device disclosed in Japanese Utility Model Application Publication No. H6-30529. As shown in FIG. 3, the falling prevention device comprises a cylindrical boss 23, which is formed by burring so as to project toward the facing surface, around the first through hole 22A or the second through hole 22B of the holding member 2. The boss 23 is fit into the opening 61A of the mounting member 61 to thereby avoid falling.

(Nut)

The nut 3 comprises the bolt insertion hole 31 in which the bolt 7 is screw-engaged. Also, the nut 3 is arranged on an outer surface of the first opposing portion 21A, which is distant from the target 100. The "outer surface" here means a surface reverse to the facing surface (or interior surface) of each of the first and second opposing portions 21A, 21B.

Although there is no particular limitation to a method for coupling the nut 3 and the holding member 2, projection welding may be preferably used when metal materials are employed for the nut 3 and the holding member 2. Particularly, according to the present disclosure, possible deformation of the first opposing portion 21A caused by welding may be less likely to affect position accuracy of the spacer 4; thus, coupling by welding is preferable.

(Spacer)

The spacer 4 is a cylindrical member, which is also referred to as a collar, and reduces transmission of noise occurring in the target 100 to the mounting member 61, thereby achieving improved quietness in a vehicle.

The spacer 4 is arranged on an outer surface of the second opposing portion 21B, which is close to the target 100. Specifically, the spacer 4 comprises a first end that is coupled to the outer surface of the second opposing portion 21B so as to surround the bolt insertion hole 31 when viewed along a central axis of the nut 3 (the X-axis direction in the figure). Also, a central axis of the spacer 4 is parallel to or coaxial with the respective central axes of the nut 3 and the bolt 7.

Although there is no particular limitation to a method for coupling the spacer 4 and the holding member 2, arc welding may be preferably used when metal materials are employed for the spacer 4 and the holding member 2. Particularly, according to the present disclosure, possible deformation of the second opposing portion 21B caused by welding may be less likely to affect position accuracy of the nut 3 and entrance of sputter during welding into the nut 3 may be reduced; thus, coupling by welding is preferable.

The spacer 4 also comprises a second end that abuts a surface of the target 100 as shown in FIG. 2. Accordingly, the target 100 and the mounting member 61 are separated from each other. The nut 3 is inserted through an internal space of the spacer 4.

<Bolt>

As shown in FIG. 2, the bolt 7 is screw-engaged in the bolt insertion hole 31 of the nut 3. The bolt 7 is inserted from an opening formed in the target 100 through the spacer 4 toward the bolt insertion hole 31.

Specifically, the bolt 7 is inserted from inside the dash panel or the cowl panel so as to pass through (in order, from left to right in FIG. 2): an opening formed in the target 100, the internal space of the spacer 4, the second through hole 22B of the holding member 2, the opening 61A of the mounting member 61, and the first through hole 22A of the holding member 2, and then is screw-engaged in the bolt insertion hole 31 of the nut 3. A head of the bolt 7 is arranged inside the dash panel or the cowl panel.

[1-2. Manufacturing Method]

Hereinafter, a manufacturing method of the fastening component 1 will be described.

The fastening component 1 is obtained by a manufacturing method that comprises a nut attachment process to attach the nut 3 to a plate material, a spacer attachment process to attach the spacer 4 to the same plate material, and a bending process to bend the plate material to thereby form the first and second opposing portions 21A, 21B of the holding member 2.

There is no limitation to the order of the nut attachment process, the spacer attachment process, and the bending process. That is, these processes may be performed in an optional order. Hereinafter, some typical manufacturing methods will be described by way of example.

<First Manufacturing Method>

In a first manufacturing method, the bending process is performed after the nut attachment process and the spacer attachment process are performed, that is, after the nut 3 and the spacer 4 have been attached to a flat plate. According to this method, in which the nut 3 and the spacer 4 are attached to the flat plate in mutually separated positions, it is easy to reduce entrance of welding sputter, or the like, into the nut 3 or the spacer 4. The first through hole 22A is formed at an appropriate time point in a position corresponding to an attachment position of the nut 3, and the second through hole 22B is formed at an appropriate time point in a position corresponding to an attachment position of the spacer 4.

<Second Manufacturing Method>

In a second manufacturing method, the bending process is performed after only one of the nut attachment process and the spacer attachment process is performed, and then the remaining one of the nut attachment process and the spacer attachment process is performed. According to this method, it is possible to securely hold, in the bending process, a surface of the plate material to which neither the nut 3 nor the spacer 4 is attached (yet), thus allowing easy bending operation.

After the bending, the attachment position of the nut 3 and the attachment position of the spacer 4 are close to each other; thus, sputter or the like, which is caused by subsequent attachment of the nut 3 or the spacer 4 (whichever has not yet been attached), tends to enter the nut 3 or the spacer 4 that has already been attached through the first and second through holes 22A, 22B. In this case, insertion of a sputter cover or the like between the first and second opposing portions 21A, 21B after the bending process may avoid entrance of sputter or the like.

[1-3. Effects]

According to the embodiment detailed above, the following effects can be achieved.

(1a) The nut 3 and the spacer 4 are attached to relatively separated portions of the holding member 2 (before bending); thus, it is possible to reduce deterioration in attachment accuracy of one of the nut 3 and the spacer 4 that may be caused by deformation of the holding member 2 during attachment of the other of the nut 3 and the spacer 4.

Since the nut 3 and the spacer 4 are attached to respective separated portions of the holding member 2, it is possible to reduce entrance of foreign matter, which is generated during attachment of one of the nut 3 and the spacer 4, into the other one of the nut 3 and the spacer 4.

The above described effects may lead to an improved mounting workability of the brace 6 to the dash panel or the cowl panel and may lead to an improved reliability of fixation between the brace 6 and the dash panel or the cowl panel after fastening.

(1b) Interference is less likely to occur between attachment (such as welding) of the nut 3 and attachment of the spacer 4 to the holding member 2 as described above; thus, increased options for attachment measures of the nut 3 and the spacer 4 can be achieved.

(1c) The mounting member 61 may be fixed to the holding member 2 with a known falling prevention device; thus, the mounting member 61 requires no particular processing (no welding). Also, an existing clip nut may be used as the holding member 2 and the nut 3, which leads to reduction in the number of welding points. As a result, reduction in manufacturing costs can be achieved.

2. Other Embodiment

Although one embodiment of the present disclosure has been described above, it is to be understood that the present disclosure is not limited to the above-described embodiment but may be practiced in various forms.

(2a) In the fastening component 1 and the fastening structure 10 of the above-described embodiment, a brace coupled to an instrument panel reinforcement is exemplified as the mounting member 61, and a dash panel or a cowl panel is exemplified as the target 100. However, the mounting member 61 and the target 100 should not be limited to these. The mounting member 61 and the target 100 may be any members that are constituent members of a vehicle and are fastened and fixed to each other.

(2b) In the fastening structure 10 of the above-described embodiment, the shape of the brace 6 shown in FIG. 2 is merely an example. Accordingly, the brace 6 may be configured with only a piece of plate-like mounting member or may be configured with three or more mounting members.

Also, for example, a plurality of mounting members may be arranged in parallel not in the vertical direction but in the vehicle right-left direction.

Further, the end portion of the mounting member 61 held by the holding member 2 of the fastening component 1 is not always required to be bent downward as shown in FIG. 2.

(2c) In the fastening component 1 and the fastening structure 10 for vehicles of the above-described embodiment, the orientation or the shape of the holding member 2 is not limited to that shown in FIG. 2. For example, the bottom surface of the holding member 2 need not be positioned downward. In other words, the holding member 2 may be attached to an optional position in the end portion of the mounting member 61 in an optional direction (for example, the vehicle right-left direction or the vehicle front-rear direction).

(2d) A function performed by a single element in the above-described embodiment may be achieved by a plurality of elements, or a function performed by a plurality of elements may be achieved by a single element. Also, a part of a configuration of the above-described embodiment may be omitted. Further, at least a part of a configuration of the above-described embodiment may be added to, or may replace, other configuration of the above-described embodiment. Any form included in the technical idea defined by the language of the claims may be an embodiment of the present disclosure.

What is claimed is:

1. A fastening component for vehicles comprising:
   a holding member made of a piece of plate material and bent to form a first opposing portion and a second opposing portion that oppose each other;
   a nut comprising a bolt insertion hole and arranged on an outer surface of the first opposing portion; and
   a spacer having a cylindrical shape and arranged on an outer surface of the second opposing portion, wherein the spacer is arranged opposite to the nut across the holding member, and wherein an inner circumference of the spacer surrounds the bolt insertion hole when viewed along a central axis of the nut,
   the holding member comprising a first through hole penetrating the first opposing portion in a thickness direction thereof and a second through hole penetrating the second opposing portion in a thickness direction thereof, and
   the first and second through holes being arranged to be continuous with the bolt insertion hole of the nut.

2. A fastening structure for vehicles comprising:
   the fastening component for vehicles according to claim 1; and
   a mounting member comprising a plate-shaped portion, the mounting member being configured to be held by the first and second opposing portions of the holding member and comprising an opening arranged to be continuous with the bolt insertion hole of the nut.

3. The fastening structure for vehicles according to claim 2, further comprising:
   an instrument panel reinforcement,
   wherein the mounting member comprises a brace having one end portion coupled to the instrument panel reinforcement and the other end portion fastened to a dash panel or a cowl panel of a vehicle.

4. The fastening structure for vehicles according to claim 3, further comprising:
   a bolt configured to be screw-engaged in the bolt insertion hole of the nut,
   wherein the bolt is configured to be inserted through the spacer into the bolt insertion hole.

5. The fastening component for vehicles according to claim 1, wherein the spacer abuts against the outer surface of the second opposing portion of the holding member in an end of the spacer along a central axis of the spacer.

6. A fastening structure for vehicles, comprising:
   the fastening component for vehicles according to claim 1,
   a bolt configured to be screw-engaged in the bolt insertion hole of the nut.

7. The fastening structure for vehicles according to claim 6, wherein the bolt is inserted through the spacer into the bolt insertion hole.

* * * * *